No. 793,713. PATENTED JULY 4, 1905.
M. J. COMERFORD.
CATTLE GUARD.
APPLICATION FILED JAN. 7, 1903.

2 SHEETS—SHEET 1.

WITNESSES:
F. B. Townsend,
John H. Miller

INVENTOR.
Michael J. Comerford
BY Henry Love Clarke,
his ATTORNEY.

No. 793,713. PATENTED JULY 4, 1905.
M. J. COMERFORD.
CATTLE GUARD.
APPLICATION FILED JAN. 7, 1903.
2 SHEETS—SHEET 2.
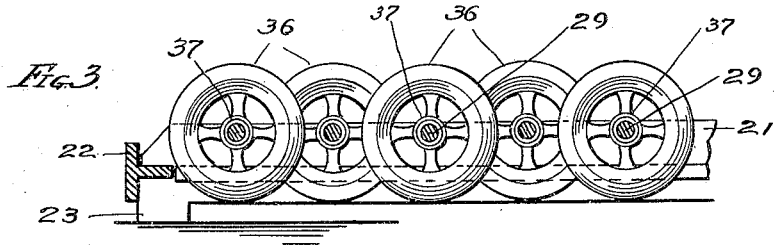
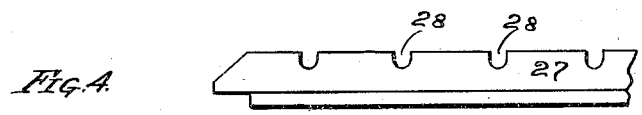
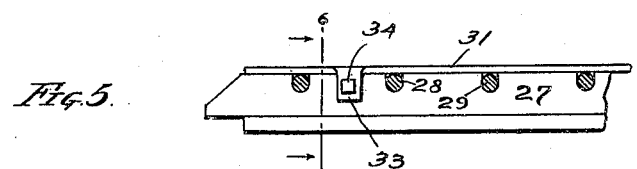 
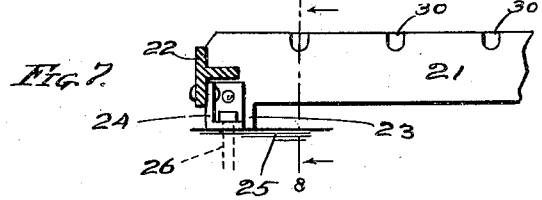 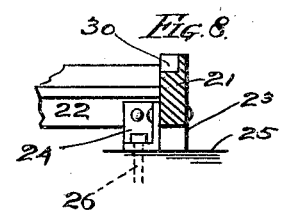
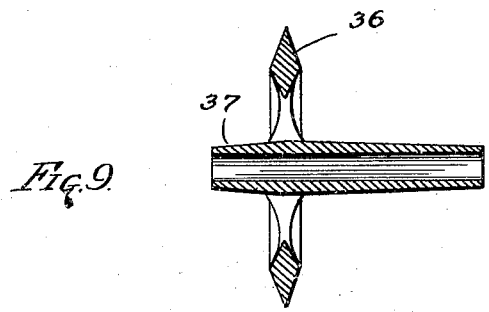
WITNESSES:
F. B. Townsend,
John H. Miller
INVENTOR.
Michael J. Comerford
BY Henry Love Clarke,
his ATTORNEY.

No. 793,713.  
Patented July 4, 1905.

UNITED STATES PATENT OFFICE.

MICHAEL J. COMERFORD, OF CHICAGO, ILLINOIS, ASSIGNOR OF ONE-HALF TO MICHAEL C. McDONALD, OF CHICAGO, ILLINOIS.

CATTLE-GUARD.

SPECIFICATION forming part of Letters Patent No. 793,713, dated July 4, 1905.

Application filed January 7, 1903. Serial No. 138,104.

*To all whom it may concern:*

Be it known that I, MICHAEL J. COMERFORD, a citizen of the United States, residing at Chicago, in the county of Cook and State of Illinois, (assignor of an undivided one-half interest to MICHAEL C. McDONALD, of the same place,) have invented a new and useful Cattle-Guard, whereof the following is a specification.

My invention relates to that class of devices known as "cattle-guards," which are used to turn cattle and horses at the sides of road-crossings of railways to prevent the animals from getting upon the fenced-in right of way.

It has for its object the production of a cattle-guard of maximum effectiveness, simplicity, and durability presenting so insecure a footing for cattle or horses as to be impassable by them, having a construction adapted to free itself of any clogging of dirt, snow, or ice, and to avoid accumulation of moisture, and having no projecting parts of such form as to catch or entangle chains or other attachments pendent from passing trains.

Figure 1:
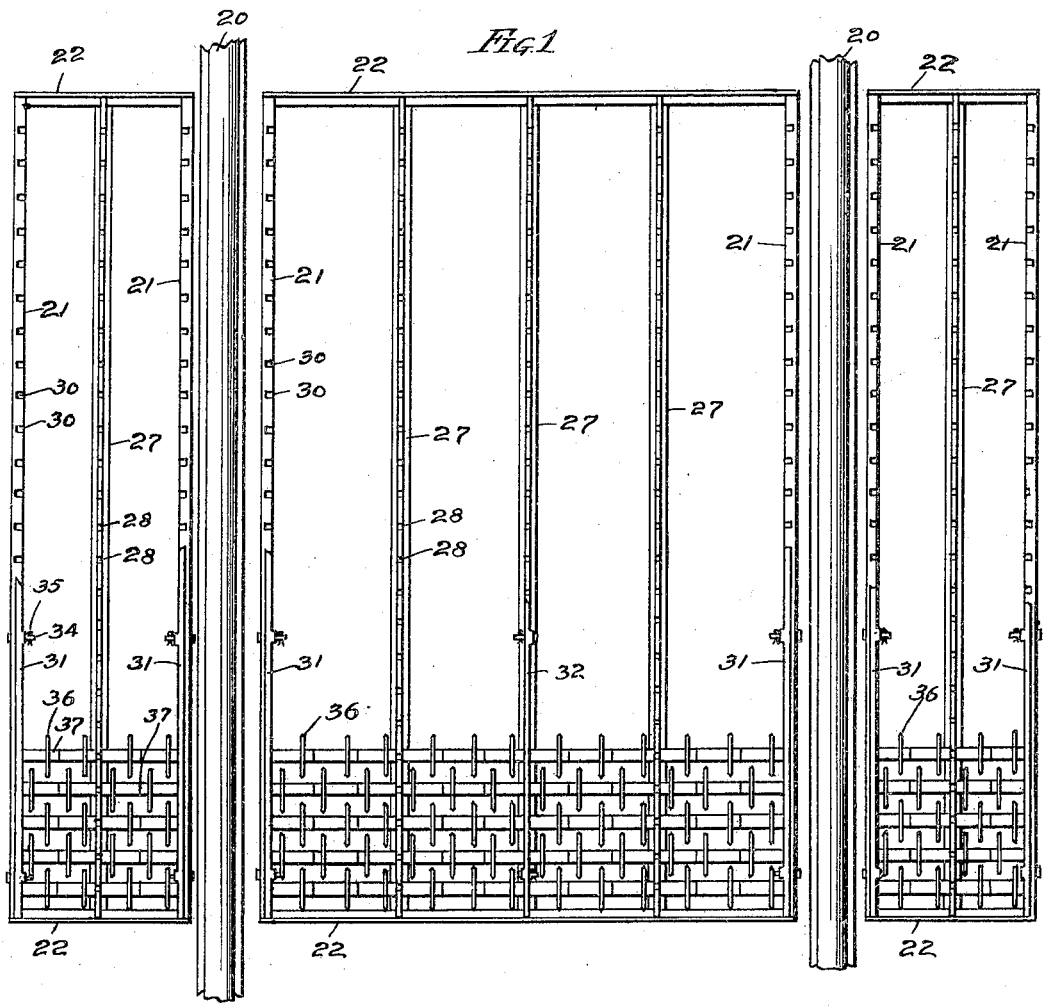
Figure 2:
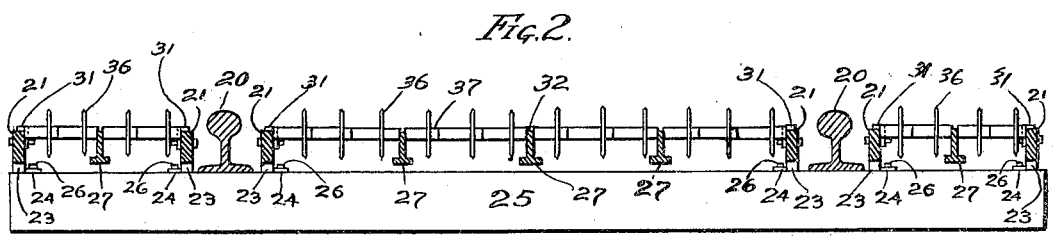

In the accompanying drawings, forming a part of this specification, Figure 1 is a top plan view of the device applied to an ordinary railroad-track, but with only part of the wheel bearing-shafts in place. Fig. 2 is a transverse section of Fig. 1. Fig. 3 is a side elevation of some of the hub-wheels in place adjacent to a side piece of the device. Fig. 4 is a side elevation of part of one of the cross-bars. Fig. 5 is the same as Fig. 4, but with a binder-strip in place to secure the shaft ends that are shown in section. Fig. 6 is a sectional view on and from the line 6 6 of Fig. 5. Fig. 7 is a fragmentary inside view of a corner of the framework. Fig. 8 is a sectional view on and from the line 8 8 of Fig. 7. Fig. 9 is a longitudinal sectional view of one of the hub-wheels.

Like reference-numerals indicate like parts in all the figures.

20 20 are the railroad-tracks. Between them is the main or center section of the cattle-guard, and outside of them, on the respectively opposite sides, are the two side sections. The outer framework of each section consists of two side pieces 21 21, parallel with the tracks, and two end pieces 22 22. The said side pieces are provided at each end with a foot 23 and lug 24, resting on and secured to the tie 25 by a lag-screw 26. The lugs 24 24 may also be secured, as shown in Figs. 7 and 8, to the end pieces 22 22, and the latter are T-shaped and may be let into the ends of the side pieces 21 21. Resting upon the horizontal wings of the said end pieces 22 22 are the likewise T-shaped cross-bars 27 27, three in number in the center section and one in each of the side sections, and each is provided with a series of notches 28 28, just deep enough to receive the wheel-shafts 29 29, the ends of the latter being fitted closely into sockets 30 30 in the side pieces 21 21. The said wheel-shafts are secured in place by binder-strips 31 31 on each of the said side pieces and by an additional binder-strip 32 on the central cross-bar of the center section of the guard. Each of the said binder-strips 31 31 and 32 is provided with lugs 33 33, turned down and adapted to receive the bolts 34 34, secured by the cotter-pins 35 35. The wheel-shafts 29 29 carry the freely-rotatable asymmetrical "hub-wheels" 36 36, so termed by reason of the relatively large development of the hubs to subserve further functions than the mere carrying of the wheels. The short hubs 37 37 point in opposite directions on alternate shafts, so that the wheels stagger throughout the entire guard, as indicated in Fig. 1. The projecting hubs of the said wheels serve as tubular separating parts to space adjacent wheels from each other on the shafts 29 29. If such tubular separating parts were separate from the wheels proper instead of forming the hubs integral therewith, they would in such case still subserve the function of properly spacing the wheels from each other on the shafts; but they would entirely fail to perform the function of strengthening and supporting the said wheels and rendering the same rigidly perpendicular to the said shafts, aside from the further fact that such construction would more than double the number of loose members in each section of the cattle-guard.

It is obvious that the device described accomplishes the objects summarized in the third paragraph of the foregoing.

Although my invention is hereinabove set forth as embodied in certain particular and preferable forms of construction, I do not limit it to such special forms or to less than all the possible forms in which the invention as hereinafter claimed may be embodied.

I now claim—

1. A cattle-guard having a plurality of fully-rotatable contiguous hub-wheels, substantially as specified.

2. A cattle-guard having a plurality of fully-rotatable contiguous hub-wheels arranged to stagger with each other, substantially as specified.

3. A cattle-guard having a plurality of freely-rotatable asymmetrical hub-wheels arranged to stagger with each other, substantially as specified.

4. In a cattle-guard, in combination, a plurality of fully-rotatable contiguous hub-wheels, shafts to carry said hub-wheels, and a framework to sustain said shafts, substantially as specified.

5. In a cattle-guard, in combination, a plurality of freely-rotatable asymmetrical hub-wheels arranged to stagger with each other, shafts to carry said hub-wheels, cross-bars to support said shafts, and an outer framework to sustain said shafts and cross-bars, substantially as specified.

6. In a cattle-guard, in combination, a plurality of freely-rotatable asymmetrical hub-wheels arranged to stagger with each other, shafts to carry said hub-wheels, cross-bars to support said shafts, an outer framework to sustain said shafts and cross-bars, and binder-strips to secure said shafts, substantially as specified.

7. In a cattle-guard, in combination, a plurality of freely-rotatable asymmetrical hub-wheels arranged to stagger with each other, shafts to carry said hub-wheels, cross-bars to support said shafts, binder-strips to secure said shafts, and an outer framework to sustain said shafts and cross-bars, said framework consisting in side pieces joined together by end pieces, the side pieces being socketed to receive the aforesaid shafts, substantially as specified.

8. In a cattle-guard, in combination, a plurality of freely-rotatable asymmetrical hub-wheels arranged to stagger with each other, shafts to carry said hub-wheels, cross-bars to support said shafts, binder-strips to secure said shafts, and an outer framework to sustain said shafts and cross-bars, said framework being provided with feet adapted to elevate the entire device above the level of the ties and consisting in side pieces joined together by end pieces, the side pieces being socketed to receive the aforesaid shafts, substantially as specified.

In testimony whereof I have hereunto set my hand in the presence of two subscribing witnesses.

MICHAEL J. COMERFORD.

Witnesses:
    GEO. C. BASSETT,
    W. V. BASSETT.